US008758675B2

(12) United States Patent
Böhm et al.

(10) Patent No.: US 8,758,675 B2
(45) Date of Patent: Jun. 24, 2014

(54) METHOD FOR FABRICATING AN OPEN-POROUS METAL FOAM BODY, METAL FOAM BODY FABRICATED THIS WAY AS WELL AS ITS APPLICATIONS

(75) Inventors: Alexander Böhm, Hänichen (DE); Dirk Naumann, Mississauga (CA); Tilo Büttner, Radebeul (DE); Gunnar Walther, Dresden (DE); Shadi Saberi, Oakville (CA); Lloyd Timberg, Burlington (CA)

(73) Assignees: Alantum Corporation, Seongnam (KR); Fraunhofer Gesellschaft zur Forderung der Angewandten Forschung E.V., Munich (DE)

( * ) Notice: Subject to any disclaimer, the term of this patent is extended or adjusted under 35 U.S.C. 154(b) by 991 days.

(21) Appl. No.: 11/816,868

(22) PCT Filed: Feb. 24, 2006

(86) PCT No.: PCT/EP2006/001699
§ 371 (c)(1),
(2), (4) Date: Aug. 22, 2007

(87) PCT Pub. No.: WO2006/089761
PCT Pub. Date: Aug. 31, 2006

(65) Prior Publication Data
US 2008/0148940 A1    Jun. 26, 2008

(30) Foreign Application Priority Data
Feb. 28, 2005  (DE) .................. 10 2005 010 248

(51) Int. Cl.
*B22F 3/11*    (2006.01)
(52) U.S. Cl.
USPC ............ 419/2; 419/5; 419/9; 419/23; 419/37; 419/46; 428/566

(58) Field of Classification Search
USPC ......................................... 419/5, 2
See application file for complete search history.

(56) References Cited

U.S. PATENT DOCUMENTS

| 5,011,638 A * | 4/1991 | Pinkhasov .................... 264/414 |
| 6,602,315 B2 * | 8/2003 | Hendrickson et al. .......... 75/255 |
| 2005/0132843 A1 * | 6/2005 | Jiang et al. ...................... 75/252 |
| 2005/0265882 A1 * | 12/2005 | Naumann et al. ................. 419/2 |

FOREIGN PATENT DOCUMENTS

| DE | 10150948 | 5/2003 |
| DE | 10346281 | 6/2006 |
| JP | 59049840 A * | 3/1984 |
| JP | 08325604 A * | 12/1996 |
| WO | WO 03033192 A2 * | 4/2003 |
| WO | WO 2005037467 A2 * | 4/2005 |

OTHER PUBLICATIONS

Alexander Böhm et al., Preparation and properties of high-temperature stable NiAl and Inconel-based foams, Euro PM2004 Conference Proceedings, European Powder Metallurgy Association, Shrewsbury, UK, Oct. 17-21, 2004.*

*Primary Examiner* — Roy King
*Assistant Examiner* — Christopher Kessler
(74) *Attorney, Agent, or Firm* — Lexyoume IP Meister, PLLC

(57) ABSTRACT

The invention relates to a method for fabricating an open-porous metal foam body with a nickel base alloy, to a metal foam body fabricated this way as well as advantageous applications for the separation of specific components and pollutants from fluid flows. On the occasion, according to the set object open-porous metal foam bodies which have improved mechanical properties, and in addition an enlarged specific surface and/or increased surface roughness are to be provided. During fabricating it is proceeded such that an open-porous base foam body made of nickel or a nickel base alloy is coated with a liquid binding agent. Subsequent to this, a mixture of a powdery nickel base alloy and an organic component the temperature of phase transformation of which is at least 30 degrees centigrade from its solid phase to the liquid phase is deposited. The temperature should then be below the respective temperature of phase transformation. By means of thermal treatment the binding agent and the organic component are expelled, a portion of the powder particles is sintered, and a further portion of the powder particles is connected with the surface of the base foam body in a material-fit manner via sintering bridges.

12 Claims, 1 Drawing Sheet

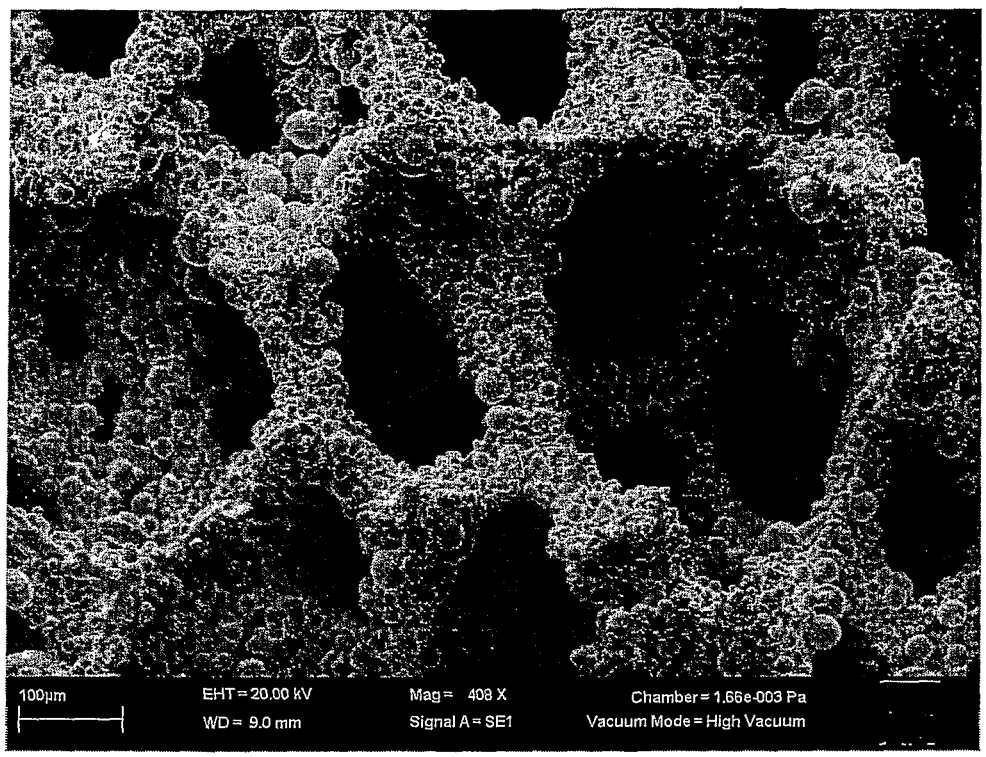

METHOD FOR FABRICATING AN OPEN-POROUS METAL FOAM BODY, METAL FOAM BODY FABRICATED THIS WAY AS WELL AS ITS APPLICATIONS

The invention relates to a method for fabricating an open-porous metal foam body with a nickel base alloy, to a metal foam body fabricated this way as such. It may be particularly advantageously used for the separation of specific components, and even pollutants from flows of fluid such as gas flows, aerosols, suspensions or sprays as well. However, an advantageous application possibility for the secondary treatment of exhaust gases from internal combustion engines is also possible, wherein for example a separation of particles which are included in such exhaust gases as well as a catalytic secondary treatment, as the case may be, herein are also allowed to be advantageously supported.

Thus, from unpublished German patent application DE 103 46 281 a method for manufacturing components with a nickel base alloy as well as components manufactured therewith are known. The components described therein are also allowed to form a foam body in an option which is made up of a nickel base alloy, at least in areas.

On the occasion, a so-called substrate core having the shape of an open-porous foam body can be coated with a metal powder which comprises further alloy elements in addition to nickel, and alloying up the initial substrate core and/or surface coating made up of a nickel base alloy can be developed during thermal treatment. With this solution, the mechanical properties can be improved over an extended temperature range towards higher temperatures. However, such known open-porous metal foam bodies provide deficits with respect to their surface structure within the open-porous layout, which have a detrimental effect on the separation/filtration in particular, and otherwise as well.

As a result, the appropriately obtainable surface roughness in particular, and even the specific surface of the inner walls of pores and on the webs are still too low to be capable of achieving a desired high degree of separation, for example.

In order to counteract this disadvantage, depositing an adequately appropriate surface coating would be a conceivable way wherein this is then possible by means of so-called CVD methods. However, as a result in particular the technological effort and cost are considerably increasing because of the industrial engineering and power required hereto. Moreover, even with such methods it cannot be ensured that a coating uniformly deposited is obtainable within the overall open-porous volume.

Furthermore, in DE 101 50 948 C1 is described a solution in which the sintered porous body is designed to have an enlarged specific surface. For this purpose, intermetallic phases or solid solutions are formed on the surface. However, such surfaces including solid solutions or intermetallic phases have a detrimental effect on specific mechanical properties such that the application is only possible with limitations in particular when influenced by alternating mechanical and/or thermal loads, if at all, and with specific additional measures which then increase the cost on top of that.

The brittleness has a detrimental effect on the use in systems for the secondary treatment of the exhaust gases of internal combustion engines, in particular, and flake offs leading up to a destruction may occur.

As a result, it is the object of the invention to provide open-porous metal foam bodies which have also an enlarged specific surface and/or an increased surface roughness in addition to the improved mechanical properties.

According to the invention, this is solved with a method comprising the features of claim 1 as well as a metal foam body according to claim 11. Advantageous developments and improvements can be achieved with the features indicated in the respective subordinate claims.

With the method according to the invention for fabricating an open-porous metal foam body with a nickel base alloy it is largely proceeded in an analogous manner as this has been described in DE 103 46 281 (no prior publication).

Accordingly, an open-porous base foam body made of nickel or a nickel base alloy is used. This is then coated on its surface with a liquid binding agent preferably with an organic binding agent. Following that, a mixture being prepared with a powdery nickel base alloy and an organic component is deposited upon the surfaces of the base foam body coated with the liquid binding agent.

The respective organic component is then selected such that its temperature of phase transition is at least 30° C., thus the transition from its solid phase into its liquid phase does not take place below the temperature of phase transition, so at least not before reaching of 30° C.

In order to ensure that the mixture to be deposited takes place completely in a solid phase upon the surface being previously coated with the liquid binding agent, depositing the mixture should take place at a temperature below the respective temperature of phase transition.

Subsequent to depositing this mixture a thermal treatment is carried out. On the occasion, the binding agent at least the organic portions thereof, as well as the organic component are expelled. During a respective rise of temperature a portion of the powder particles of the previously used powdery nickel base alloy is sintered, and another portion of the powder particles is connected unchanged as far as possible with the surface of the base foam body in a material-fit manner, wherein the material-fit connection with the surface takes place each through at least one sintering bridge of a particle. Such particles being connected in a material-fit manner remain unchanged in their shape after the thermal treatment as far as possible, wherein slightly begin sintering of such particles is to be permitted.

These individual particles of the nickel base alloy being connected in a material-fit manner can also be detected visually on the completely fabricated open-porous metal foam body, wherein these particles being connected in a material-fit manner are allowed to be positioned on the inner surfaces of pores as well as on webs forming a supporting structure of a metal foam body.

Accordingly, the open-porous metal foam bodies fabricated according to the invention have a distinctly increased roughness on their surfaces as well as an increased specific surface in contrast to the base foam body used, which was not readily possible with the open-porous base foam bodies made of nickel or a nickel alloy as determined by fabrication.

The mixture used for fabricating, and the parameters during the thermal treatment should also ensure that at least 20% of the particles which have been connected in a material-fit manner on the surface of the base foam body maintain their particle shape.

A paraffin and waxes have turned out to be a suitable organic component. Micronized amide waxes are to be mentioned as being particularly preferred.

However, in the mixture to be used according to the invention it is also possible to employ a mixture of substances as an organic component, wherein the used substances are also allowed then to have different temperatures of phase transition but which should always be greater than 30° C. Accordingly, the mixture can be made up of a powdery nickel base alloy, a first and at least another substance of an organic nature.

A nickel base alloy to be employed according to the invention should have further alloy elements in addition to nickel, which are selected from carbon, chromium, molybdenum, iron, cobalt, niobium, titanium, aluminium, boron, zirconium, manganese, silicon and lanthanum.

In case, if as a base foam body such one made of a nickel base alloy has already been used, the powdery base alloy used for the mixture should have a portion of nickel which is smaller than the portion of nickel of the respective base foam body. As a result, in particular with the sintered portion of the powdery base alloy, begin sintering can be achieved at least in the surface area of the base foam body.

In a powdery nickel base alloy which is used for the fabrication of metal foam bodies according to the invention, chromium should be included with a portion at least of 15% by weight, preferred at least of 18% by weight.

The portion of the organic component which is to be included in the mixture in addition to powdery nickel base alloy should be around at least 0.05% by weight.

During the thermal treatment, and in particular the high temperature range thereof for already mentioned sintering a portion of the powder particles, and the development of material-fit connections of another portion of powder particles, a maximum temperature within the range of 1200 and 1250° C., preferably between 1220 and 1250° C. should be maintained, and then it should be proceeded in an inert or reducing atmosphere.

In one embodiment, sintering and developing material-fit connections of said powder particles are carried out at temperatures in the range between 1200° C. and 1500° C., and in an inert or reducing atmosphere.

On the occasion, the parameters can be influenced such that the portions of particles vary which are completely sintered or connected in a material-fit manner. This may lead so far that merely the surface roughness or the specific surface is increased in a metal foam body.

Moreover, it is advantageous if a powdery nickel base alloy is used, in which the individual particles are around within a spectrum of particle sizes in the range of 20 to 35 μm. On the occasion, the maximum particle size should not exceed 60 μm. As a result, it is also allowed to influence advantageously that merely one portion of the particles of the powdery nickel base alloy can be completely sintered, and another portion which may contribute to the increase of the surface roughness and the increase of the specific surface are merely connected in the form of particles in a material-fit manner with surfaces of the base foam body used, wherein the latter maintain substantially their initial particle shape except from sintering bridges being evitably formed. During the thermal treatment it is allowed to operate with heating and cooling rates of 10 K/min.

A metal foam body according to the invention has still a sufficiently high porosity though additional application of material has occurred, and it is open-porous as ever. Thus, for example, the porosity of a base foam body made of nickel or a nickel base alloy which is usually around within the range of between 90 and 96% is merely reduced to a porosity within the range of 75 to 90%, thus reduced by 15% at maximum, wherein the reduced porosity has only a very slightly disadvantageous effect on the desired results, however, the increased surface roughness and the increased specific surface have a significantly advantageous effect on it.

A metal foam body according to the invention may also be provided subsequent to this with a further coating which is of advantage for the use in exhaust gas systems, for example. On the occasion, it is also allowed to draw on the conventional coating materials which are suitable for these applications.

In the following, the invention shall be explained by way of example in more detail, wherein FIG. 1 shows an SEM record of a portion of the open-porous structure on a metal foam body according to the invention.

The fabrication of a metal foam body according to the invention with its increased surface roughness and its specific surface can take place such that a base foam body made of nickel which comprised a porosity of 94% has been immersed into a 1% aqueous solution of polyvinylpyrrolidone having a volume of 50 ml. Subsequent to immersing, pressing out onto an absorbent pad has taken place. Because of that, the binding agent could be removed from the cavities of pores such that merely the webs and the inner surfaces of pores have been wetted.

The base foam body thus prepared and having dimension of 300 mm*150 mm*1.9 mm was fixed in a vibrating device and sprinkled with a powder mixture. By means of the vibration a uniform distribution of the powder upon the surfaces of the base foam body wetted with binding agent could be achieved. At the same time, the open porosity of the base foam body has been maintained. In the mixture was included a powdery nickel base alloy having the following composition: 0.1% by weight of carbon, 22.4% by weight of chromium, 10% by weight of molybdenum, 4.8% by weight of iron, 0.3% by weight of cobalt, 3.8% percent by weight of niobium, 58.6% by weight of nickel which is commercially available under the trade name of "Inconel 625".

Additionally, a powdery micronized amide wax having a medium particle size of 30 μm as an organic component was included with a portion of 2% percent by weight in the mixture.

The micronized amide wax (ethylenedistearamide, in the main $C_{38}H_{76}N_2O_2$) was used as powder having a medium particle size of 30 μm. The melting temperature of this micronized amide wax is in the temperature range between 140 and 145° C.

The amide wax and the nickel base alloy powders have been mixed together in a tubular mixer over a time interval of 10 minutes, at a speed of 50 revolutions per minute, and then the mixture thus obtained has been deposited upon the surfaces of the base foam body wetted with liquid binding agent.

A base foam body thus prepared and coated is allowed to be deformed yet, if necessary, wherein specific minimum bending radii should be taken into account.

During a subsequent thermal treatment with a heating rate of 10 K/min the organic constituents of the binding agent and the organic component have been expelled starting at temperatures of about 300° C. Expelling the organic constituents is completed at a temperature of appr. 600° C.

After a further rise of temperature up to the temperature range of between 1220 and 1250° C. while maintaining the holding time of appr. 30 minutes, a portion of the particles of the powdery nickel base alloy has been sintered, and another portion of the particles of this nickel base alloy has been fixed in a material-fit manner by means of at least one sintering bridge each on the surface of the base foam body, wherein particles being connected in a material-fit manner could be fixed on the webs as well as on the inner surface of pores.

For the powdery nickel base alloy a powder having a medium particle size of 30 μm was used, wherein particles having a smaller and greater particle size were included in the mixture as well.

The amide wax included in the mixture additionally as an organic component was there in a solid form at least until the mixture being applied upon the surface of the base foam body in a powdery form finely spread, since the phase transition temperature of the amide wax was distinctly above 30° C.

The completely fabricated metal foam body has still obtained a porosity of 92%, its surface roughness was considerably increased as is clearly discernible from FIG. 1, and the specific surface within the open-porous structure of the metal foam body could also be increased in contrast to the base foam body.

However, in place of a base foam body made of nickel, a base foam body made of a nickel base alloy can also be used.

The invention claimed is:

1. A method for fabricating an open-porous metal foam body, the method comprising:
    applying a liquid binding agent to an open-porous base foam body that is made of a nickel base alloy;
    after applying the liquid bindinq agent to the open-porous base foam body, depositing a powder mixture of a powdery nickel base alloy and a powdery organic component upon the open-porous base foam body, wherein the powdery organic component has a phase transition temperature, wherein deposition occurs at a temperature below the phase transition temperature, and wherein the powdery nickel base alloy includes at least 15 wt % chromium; and
    subsequent to the deposition, conducting a thermal treatment at a temperature between 1,200° C. and 1,250° C. in an inert or reducing atmosphere,
    wherein the thermal treatment (a) expels the liquid binding agent and the powdery organic component, (b) sinters a first portion of the powdery nickel base alloy, and (c) connects, in a material-fit manner, a second portion of the powdery nickel base alloy to the open-porous base foam body via sintering bridges, wherein at least 20% of particles in the second portion of the powdery nickel base alloy maintain their particle shape during the thermal treatment, and
    wherein a nickel component of the powdery nickel base alloy is smaller than a nickel component of the nickel base alloy.

2. The method of claim 1, wherein the powdery organic component comprises at least one of a paraffin powder or a wax powder.

3. The method of claim 1, wherein the powdery organic component is used in the form of a substance mixture.

4. The method of claim 1, wherein the nickel base alloy includes at least one further alloy element selected from the group consisting of carbon, chromium, molybdenum, iron, cobalt, niobium, titanium, aluminum, boron, zirconium, manganese, silicon and lanthanum.

5. The method of claim 1, wherein the powdery nickel base alloy includes at least 18 wt % chromium.

6. The method of claim 1, wherein the powdery organic component comprises at least 0.05 wt % of the mixture.

7. The method of claim 1, wherein the powdery nickel base alloy consists of particles that are smaller than about 60 μm and that have a median particle size between about 20 μm and about 35 μm.

8. The method of claim 1, wherein:
    the powdery nickel base alloy includes at least 18 wt % chromium; and
    the powdery organic component comprises at least one of a paraffin powder or a wax powder.

9. The method of claim 1, wherein the thermal treatment also sinters a surface portion of the open-porous base foam body.

10. The method of claim 1, wherein the thermal treatment is conducted with a maximum temperature in the range between 1220° C. and 1250° C.

11. The method of claim 1, further comprising, before depositing the powder mixture, removing the liquid binding agent from cavities in the open-porous base foam body by pressing with an absorbent pad.

12. The method of claim 1, wherein the powdery organic component has a melting temperature between 140° C. and 145° C.

* * * * *